United States Patent [19]

Moretto

[11] 4,181,844

[45] Jan. 1, 1980

[54] THEATRE LIGHTING CONTROL SYSTEM

[76] Inventor: Jose P. Moretto, 284 W. First St., El Paso, Ill. 61738

[21] Appl. No.: 832,787

[22] Filed: Sep. 12, 1977

[51] Int. Cl.[2] .............................................. H02J 3/00

[52] U.S. Cl. .................................. 307/157; 307/115; 315/314; 315/319; 315/321; 361/334; 361/347

[58] Field of Search ....................... 307/157, 112-115, 307/147; 315/312-314, 316, 317, 319-321; 361/334, 346, 347, 371

[56] References Cited

U.S. PATENT DOCUMENTS

| | | | |
|---|---|---|---|
| 2,023,878 | 12/1935 | Frank | 307/157 |
| 2,625,591 | 1/1953 | George | 307/157 |
| 2,778,957 | 1/1957 | Fuchs | 361/334 |
| 2,988,655 | 6/1961 | Rudolph | 361/334 |

FOREIGN PATENT DOCUMENTS

| | | | |
|---|---|---|---|
| 409711 | 5/1934 | United Kingdom | 315/317 |

*Primary Examiner*—L. T. Hix
*Assistant Examiner*—S. D. Schreyer
*Attorney, Agent, or Firm*—Thomas R. Vigil

[57] ABSTRACT

The theatre lighting control system comprises a patchboard having a plurality of receptacles mounted thereon and a switchboard associated with the patchboard and having a plurality of switches mounted thereon. The receptacles and switches on the respective boards are mounted in a generally rectangular matrix such that a row of switches on the switchboard is aligned with and electrically coupled to a row of receptacles on the patchboard. Also, a control switch is provided for each group of aligned rows of switches and receptacles and is adapted to be connected to a dimmer switch. The receptacles are adapted to receive male plugs from theatre lamp circuits. Pilot lamps are associated with the receptacles and/or switches to indicate which receptacles are energized.

4 Claims, 2 Drawing Figures

THEATRE LIGHTING CONTROL SYSTEM

BACKGROUND OF THE INVENTION

1. Field of the Invention

The field of the present invention is theatre lighting control systems and more specifically a theatre lighting control system including a pre-selectable switching system for electric lamps utilized in the lighting system.

2. Description of the Prior Art

In theatre lighting control systems presently in use today it is very common to employ dimmer switches which can be of the rheostat type or which can be of the silicon controlled rectifier type devices. Typically, a plurality of dimmer switches are utilized and a number of lamps are connected to each dimmer switch. In this respect, it is common to connect two to five lamp circuits to one dimmer switch so that the intensity of light from all of these lamps will be approximately the same. Also, when fading out a scene, all the lamps will be controlled by one dimmer switch. In many theatres a rather simple circuitry is utilized consisting of a plurality of dimmer switches each of which has a cable leading therefrom to an electrical junction box which has two to five female receptacles mounted therein into which male plugs from the lamp circuits can be inserted and energized.

With the system described above there are many lamp circuit cables and dimmer switch junction boxes lying around on the floor in the theatre lighting booth. Also, it will be appreciated that everytime it is necessary to change connections and reconnect lamps to different dimmer switches, it is necessary to trace the lamp circuit cable and the junction box from the particular dimmer switch to reconnect the right cable to the desired dimmer switch. This usually involves getting down on the floor to unplug or plug in the various male plugs. Since the receptacles and plugs are located on the floor and at a distance from the dimmer switches some time is taken up in moving from the dimmer switches to the floor to reconnect the various lamp circuits desired. Also, the junction boxes and cables clutter up the floor and are a hazard to people moving around in the lighting booth. Moveover, it is easy to make mistakes in connecting, disconnecting and reconnecting the lamp circuits to various dimmer switches.

With a view toward simplifying the control of electric lamp circuits for a theatre lighting system various lighting systems have been proposed. Typically these systems have proposed a unitized approach to the control of the lamp circuits. In this respect, instead of having a male plug at the end of each cable from a lamp circuit the cables are connected directly to various conductors, bus bars, switches, etc., in a power unit and then conductors therefrom are connected to switches on a switchboard for operation by the theatre lighting personnel. Examples of such previously proposed theatre lighting control systems and related electric lamp control systems are disclosed in the following U.S. Patents:

| U.S. Pat. No. | Patentee |
|---|---|
| 1,669,521 | Hunter |
| 1,799,789 | Gwynne |
| 2,023,878 | Frank |
| 2,802,144 | Spear |
| 2,943,241 | Macnamara et al |
| 3,060,347 | Burski |
| 3,796,915 | Bickl et al |
| 3,943,397 | Yancey |

The previously proposed theatre lighting control systems did not always provide for physical disconnection (other than through electric switches) and reconnection of the electric lamp cable from one dimmer switch to another dimmer switch. Also, in the previously proposed systems which were unitized systems it was necessary to connect the theatre lamp cables to a central power unit.

As will be described in greater detail hereinafter, the theatre lighting control system of the present invention provides a simple system which is less expensive than a unitized system and yet eliminates cluttering up the floor with cables and junction boxes. Also, as will be described in greater detail hereinafter, the theatre lighting control system of the present invention provides for a simple connection of existing male plugs at the end of the existing lamp circuit cables to a patchboard of receptacles and then control of the energization of the lamps by means of switches coupled to the receptacles. In this way a theatre lamp circuit can be disconnected both by an electrical switch and by manual removal of a male plug from a female receptacle. Additionally, the system can be easily installed in a lighting booth with little alteration of the existing lighting control system.

SUMMARY OF THE INVENTION

According to the invention there is provided a theatre lighting control system comprising a console including an upper switchboard and a lower patchboard, a plurality of electrical receptacle means, each electrical receptacle means being mounted on said patchboard for receiving male plugs, each receptacle means being coupled to a dimmer switch for controlling intensity of light from theatre lamp circuits and including a plurality of electrical receptacles, a plurality of first sets of switch means being mounted on said switchboard for coupling one of said receptacle means to a dimmer switch, each first set of switch means being coupled to one of said receptacle means and including a plurality of switches with each switch being coupled to one of said receptacles and connected in such a manner, as to complete when closed, a circuit to said receptacle, each said receptacle being adapted to receive a male plug at the end of a cable leading to a theatre lamp circuit, a plurality of control switches, each control switch being associated with one of said first sets of switch means and being operable to connect or disconnect said first set of switch means and associated receptacle means to or from an associated dimmer switch, said control switch being a single pole, double throw switch and said lighting system including a plurality of second sets of switch means, each second set of switch means being associated with one of said receptacle means and including a plurality of switches with each switch being coupled to one of said receptacles and connected in such a manner as to complete, when closed, a circuit from said control switch to said associated receptacle, said control switch being operable to connect an associated dimmer switch to one or the other of said first and second sets of switch means which are coupled to and associated with one of said receptacle means.

DESCRIPTION OF THE PREFERRED EMBODIMENTS

Figure 1:
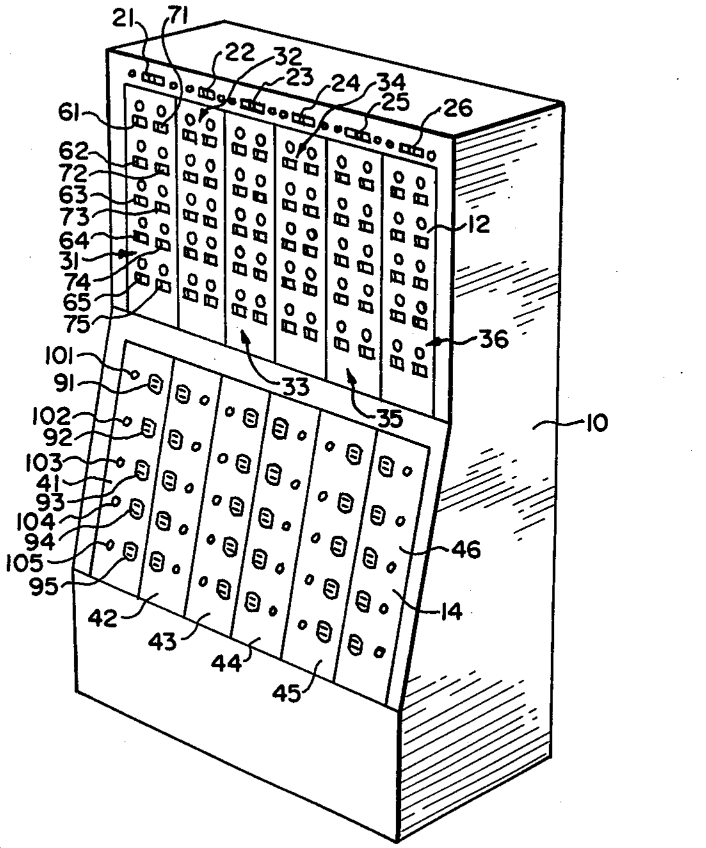
FIG. 1 is a perspective view of a console embodying the theatre lighting control system of the present invention and more specifically embodying a patchboard mounting female receptacles and a switchboard mounting switches associated with the receptacles.

Referring now to the drawings in greater detail there is illustrated in FIG. 1 a console 10 embodying the theatre lighting control system of the present invention. The console 10 includes an upper switchboard 12 and a lower patchboard 14. The boards 10 and 12 are electrically interconnected in a manner to be described below in connection with the description of FIG. 2.

In the preferred embodiment illustrated in FIG. 1 the switchboard 12 includes six master control switches 21–26. Each of the master control switches 21–26 on the switchboard 12 is associated with a bank of switches which are identified generally by the reference numerals 31–36.

Figure 2:
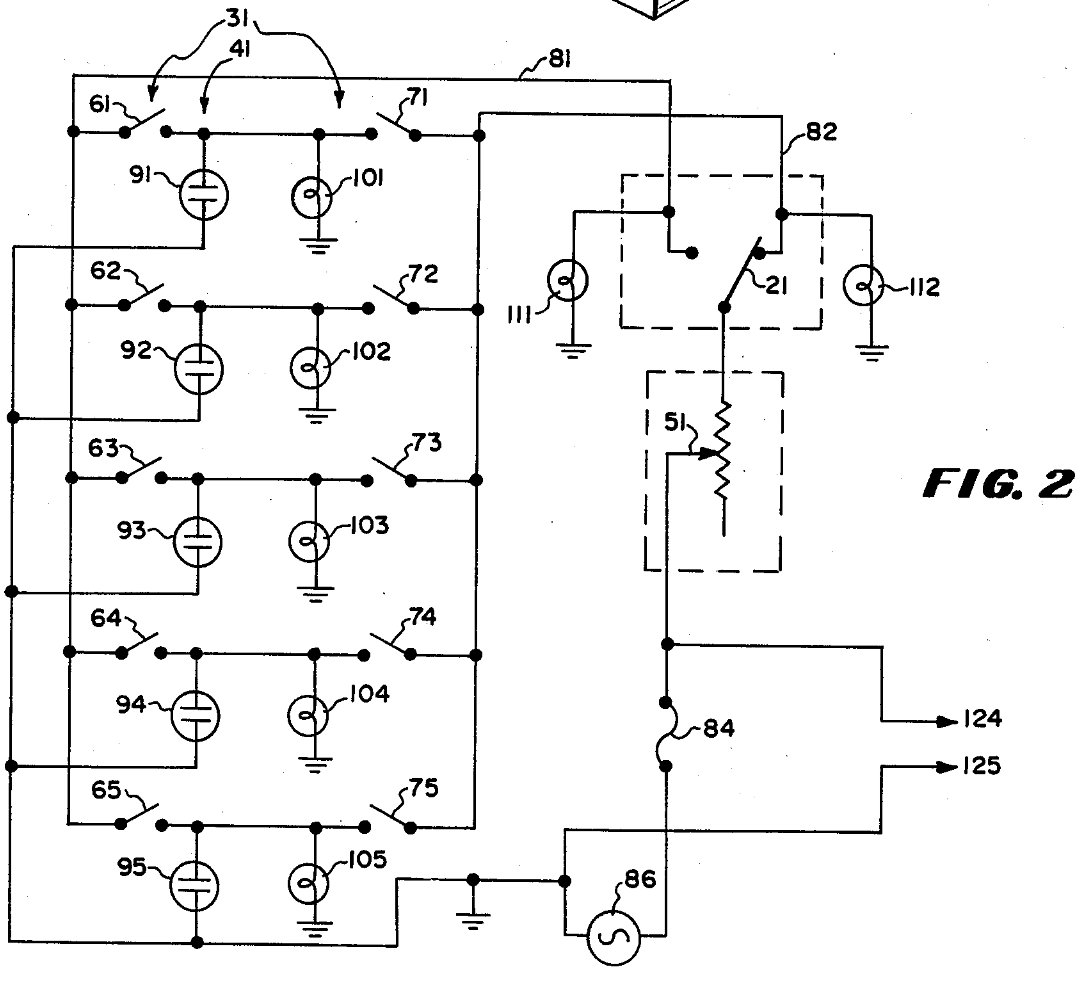
FIG. 2 is a schematic electrical circuit diagram for the electrical circuit of the theatre lighting control system provided for one of the six dimmer switches which are connected to the console shown in FIG. 1.

Each master control switch 21–26 and bank of switches 31–36 is coupled to and associated with one of the banks of receptacles 41–46 mounted on the patchboard 14. It will be appreciated that each bank of receptacles 41–46 is aligned with and disposed beneath one of the banks of switches 31–36 each of which is controlled by one of the master control switches 21–26. Each one of these aligned banks of switches 31–36 and banks of receptacles 41–46 are coupled to one of six dimmer switches one of which, dimmer switch 51, is shown in FIG. 2. Since each of these aligned switch and receptacle banks 31–36 and 41–46 are identical only one of them, banks 31 and 41 will be described in detail in connection with the description of FIG. 2.

As shown, the bank of switches 31 includes a first row of five switches 61–65 and a second row of five switches 71–75. Each of these rows of switches is coupled in parallel via a conductor 81 or 82 with one side of the master control switch 21 which is a single throw double throw switch having three positions. The first position is where the switch 21 connects the dimmer switch 51 to conductor 81 connected to the switches 61–65 through a fuse 84 and a power source 86. The second position is an open position where the dimmer switch 51 is not connected to either one of the conductors 81 or 82. The third position is the position shown in FIG. 2, where the switch 21 connects the dimmer switch 51 to the conductor 82 connected to the second row of switches 71–75 through a fuse 84 and the power source 86. It will be apparent from FIG. 2 that when any one of the switches 61–65 is closed and the switch 21 is in the first position connecting the dimmer switch 51 to the conductor 81, a circuit is completed through the dimmer switch and through the particular switch 61–65 which is closed to energize one of the five receptacles 91–95 in the bank 41 and one of the five pilot lamps 101–105 connected in parallel with the receptacles 91–95 in the bank 41. Thus, when any one of the receptacles 91–95 is energized, the pilot lamp 101–105 adjacent thereto will be energized to indicate that receptacle 91–95 is energized regardless of whether or not a male plug from a theatre lamp circuit is inserted therein.

In addition to the two rows of switches 61–65 and 71–75 in the bank 41 and master control switch 21 on the switchboard 12, there are two pilot lamps 111 and 112 associated with the master switch 21 and mounted adjacent thereto on the switchboard 12. Similar pilot lamps are associated with the other master control switches 22–26. In this way, in addition to the position of the switch indicating which conductor 81 or 82 is connected to the respective dimmer switch 51, the pilot lamp 111 or 112 also indicate which conductor 81 or 82 is connected to the switch 21. Also to facilitate connecting and disconnecting various theatre lamp circuits one pilot lamp such as pilot lamp 111 can be red and the exterior lever arms of the switches 61–65 can also be red whereas the pilot lamp 112 can be blue and the exterior lever arms of associated switches 71–75 can be colored blue.

It will be understood that the other banks of switches 32–36 and receptacles 42–46 are connected through one of the master switches 22–26 and a dimmer switch (not shown) to the fuse 84 and power source 86 as indicated by arrows 124 and 125.

In the operation of the theatre lighting control system of the present invention an operator will first plug in male plugs from theatre lamp circuits into the various receptacles in the banks 41–46. Of course, the particular receptacle into which a male plug is inserted depends upon which dimmer switch setting is desired for that theatre lamp. Also, it is likely that some receptacles in each bank will not be utilized and that one or more banks 41–46 may not even be utilized. In any event, with this arrangement lamp circuit cables and junction boxes will not be cluttering up the floor. Instead the male plugs will be inserted in one of the receptacles in the banks 41–46 and unused circuit plugs will be plugged into unenergized receptacles.

After each male plug is inserted in the appropriate receptacle the corresponding switch in the row of switches 61–65 or in the row of switches 71–75 is closed so that once the master switches 21–26 are closed to either one of the two conductors, such as the conductor 81, the lamp circuits connected to those receptacles will be energized. When this occurs the pilot lamps 101–105 and the master control pilot lamps such as pilot lamps 111 or 112 will be energized to indicate which dimmer switch circuits are energized and which receptacles are energized.

Now, while a scene is in process, the lighting operator will insert other male plugs into receptacles which are not energized and close the switches in the other row of switches e.g., switches 71–75 which are connected to the unenergized conductor of the two conductors such as the conductor 82 so that when the master switch, e.g., master switch 21 is switched from one conductor 81 to another conductor 82 on a scene change, the desired lamp circuit will be connected to a dimmer switch having the desired dimmer setting. It will be apparent that this is easy to accomplish since the pilot lamps 101–105 or similar pilot lamps in the other bank of receptacles will indicate which receptacle is energized and which receptacle is not energized. This facilitates and speeds up the connecting, disconnecting and reconnecting of the various lamp circuits to the various dimmer switches. Also, of course, where one of the aligned rows of switches and receptacles is not connected to a dimmer switch that dimmer switch can be first adjusted to the desired setting and then particular lamp circuits can be connected to the first or second row of switches associated with that dimmer switch. Then the master switch, e.g., one of switches 21–26, can be moved from an open or closed position to the desired closed position to complete a circuit from the dimmer switch to the connected lamp circuits.

In an experimental prototype of the theatre lighting control system it was found that control of theatre lighting was simplified and connections and disconnections were made much quicker with fewer mistakes being made in connecting a desired lamp circuit to the appropriate dimmer switch.

It will be apparent from the foregoing description that the theatre lighting control system of the present invention has a number of advantages some of which have been described above and others of which are inherent in the invention. Also obvious modifications can be made to the system without departing from the teachings of the present invention. In this respect, one row of switches, e.g., switches 71–75 and lamp 112 can be left out of the system if desired. Accordingly, the scope of the invention is only to be limited as necessitated by the accompanying claims.

I claim:

1. A theatre lighting control system comprising a console including an upper switchboard and a lower patchboard, a plurality of electrical receptacle means, each electrical receptacle means being mounted on said patchboard for receiving male plugs, each receptacle means being coupled to a dimmer switch for controlling intensity of light from theatre lamp circuits and including a plurality of electrical receptacles, a plurality of first sets of switch means being coupled to one of said receptacle means and including a plurality of switches with each switch being coupled to one of said receptacles and connected in such a manner, as to complete when closed, a circuit to said receptacle, each said receptacle being adapted to receive a male plug at the end of a cable leading to a theatre lamp circuit, a plurality of control switches, each control switch being associated with one of said first sets of switch means and being operable to connect or disconnect said first set of switch means and associated receptacle means to or from an associated dimmer switch, said control switch being a single pole, double throw switch and said lighting system including a plurality of second sets of switch means, each second set of switch means being associated with one of said receptacle means and including a plurality of switches with each switch being coupled to one of said receptacles and connected in such a manner as to complete, when closed, a circuit from said control switch to said associated receptacle, said control switch being operable to connect an associated dimmer switch to one or the other of said first and second sets of switch means which are coupled to and associated with one of said receptacle means.

2. The theatre lighting control system according to claim 1 wherein said receptacles of each said receptacle means are aligned in a row, said switches of each of said first or second sets of switch means are aligned in a row and each row of switches is aligned with an aligned row of receptacles of the associated receptacle means.

3. The theatre lighting control system according to claim 1 including first and second pilot lamps, each associated with one closed position of said control switch and each being coupled to a conductor from said control switch to either said first set or second set of switch means in such a manner that said lamp is turned on when the control switch is connected to that conductor to indicate which of said first or second sets of switch means is connected through the control switch to the associated dimmer switch.

4. The theatre lighting control system according to claim 1 wherein each of said associated switches and receptacles have a pilot lamp coupled thereto in such a manner that said pilot lamp is turned on when said switch is closed to indicate that the associated receptacle is energized.

* * * * *